Nov. 22, 1938.  J. A. ZUBLIN  2,137,471
COMPOSITE WELDING ROD
Filed Dec. 10, 1937
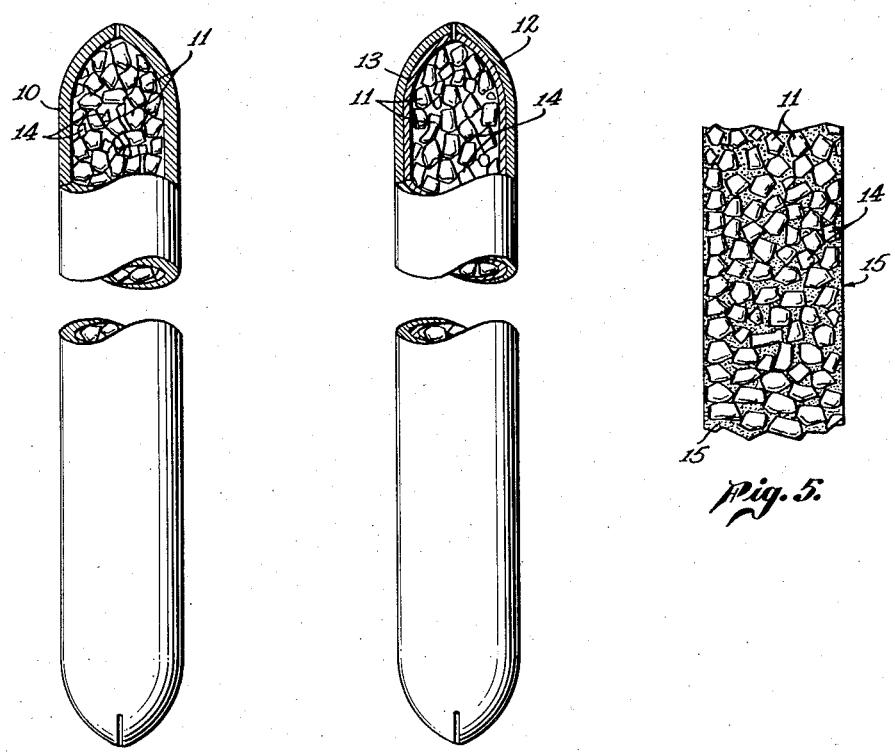
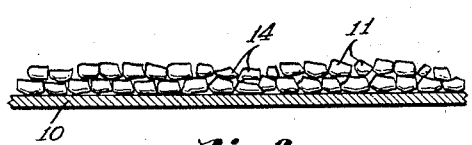
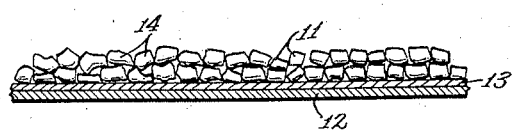
Inventor
John A. Zublin
By Bernard Kriegel
ATTORNEY Patented Nov. 22, 1938

2,137,471

UNITED STATES PATENT OFFICE 2,137,471

COMPOSITE WELDING ROD

John A. Zublin, Los Angeles, Calif.

Application December 10, 1937, Serial No. 179,136

8 Claims. (Cl. 219—8)

This invention relates to welding rods, and more specifically to composite welding rods including a hard, metallic, wear-resistant substance adapted for application to relatively softer bodies.

The application of metallic carbides to the cutting edges of various types of cutting and digging tools has had the effect of increasing their extent of use and length of efficient service materially. The carbides are usually attached by welding or brazing to the body metal, but in so doing detrimental results on the physical and chemical properties of the carbides are produced. For example, by removal of carbon, the high temperature welding flame breaks tungsten carbide down from a hard WC form to a much softer $W_2C$ product. This removal is occasioned by oxidation, which will produce carbon monoxide; and by an alloying of the carbon with the mild steel body metal, for which it has a great affinity.

The high welding temperatures produce an additional loss of tungsten carbide because of a dissolving of tungsten with the iron body metal to produce an iron-tungsten alloy. Although this alloy is of a higher order of hardness than the original mild steel body metal, yet the cutting efficiency of the tool will be decreased since it is much softer than the original WC. Furthermore, the alloying of the tungsten and the carbon with the mild steel body, while hardening it, also renders it more brittle, so that its toughness and tensile strength, and consequent gripping action on the individual particles of tungsten carbide is lessened. While the wear on the particles of tungsten carbide is very little, this lack of effective support by the body permits them to break off and become lost. Apart from the brittleness imparted to the body metal during the welding operation by the formation of high carbon and tungsten steel alloys, an increase in the tensile strength and toughness of the original bonding material is greatly to be desired.

The difficulties noted have been overcome to a marked extent by nickel plating the individual particles of tungsten carbide, as explained in my Patent No. 2,021,040. Although this has improved the performance of cutting and digging tools, I have effected still further improvements by using various forms of welding rods which provide not only similar protective capacities to the carbides, but also increase the tensile strength and toughness of the bonding body metal; all at a great saving in time and expense when compared to the nickel plating operation outlined in my above-mentioned patent.

Accordingly, it is an object of my invention to provide a welding rod which will prevent decomposition of carbides from hard to softer forms.

It is a further object of my invention to provide a welding rod which will prevent alloying of carbides with the supporting bodies to which they are to be bonded.

It is a further object of my invention to provide a welding rod which will alloy with a carbide supporting body to increase its tensile strength and toughness, and give it other desirable properties.

How these and other objects of my invention are achieved can better be understood by referring to the drawing, in which:

Fig. 1 is a partial section of one physical form of welding rod.

Fig. 2 is a partial section of a second physical embodiment of my welding rods.

Figs. 3 and 4 are respective sections of other physical forms of welding rods.

Fig. 5 is a fragmentary elevation of still another embodiment of welding rod; and Fig. 6 is a transverse section of another form of welding rod.

The above objects are attainable in a welding rod that can have various forms. Essentially, the rod will include nickel, or an equivalent substance, placed in the presence of the tungsten carbide particles in such manner that upon being melted the nickel will flow around each particle to give it a protective coating, and will then form a nickel steel alloy with the body to which the tungsten carbide is to be attached.

One such rod can include a substantially pure nickel carrier 10 supporting tungsten carbide particles 11 of the required mesh. It is not essential that the carrier be all of pure nickel. It can comprise a metallic or non-metallic carrier 12 with nickel 13 deposited on either of its surfaces by either electroplating, painting, spraying, dipping, or dusting; or it can comprise a carrier of nickel 13 or an equivalent substance with chromium, chromium and tungsten, chromium and molybdenum, or molybdenum, etc., 12 deposited on one of its surfaces, as in successive layers. With composite rods of the last-mentioned types, the nickel will protect the carbides against decomposition by flowing around them when melted by the welding flame, and will then form a nickel chrome iron, or a nickel chrome molybdenum iron, or a nickel chrome tungsten iron, or a nickel molybdenum iron alloy with the carbide supporting body metal, to enhance its physical properties and give greater security of support to the carbide particles on the body.

Although chromium, tungsten, and molybdenum have been specifically mentioned as body alloyable substances, it is to be understood that other elements can be used in conjunction with the carbide protecting ingredient, depending upon the characteristics desired in the bonding metal. A partial list of elements would include, in addition to those already mentioned, cobalt, copper, titanium, vanadium, and manganese; and various combinations thereof.

The rod can consist of any of the above-mentioned materials, and also of steel, carrying a mechanical mixture or conglomerate of tungsten carbide 11 and a carbide protecting substance, such as nickel 14.

One specific rod can be of tubular form such as is disclosed in Fig. 1. In this instance, the entire tube 10 is of substantially pure nickel, or its equivalent, containing tungsten carbide 11. Another form is illustrated in Fig. 2 where a metallic or non-metallic tube 12 is coated on its interior with nickel 13, and also contains tungsten carbide 11. Very good results have been attained by using a tube having about a ⅛" bore formed from 0.003" to 0.006" strip stock, although a different bore and heavier thickness can be used if deemed necessary.

Nor is it essential that the rod be of tubular form. The tungsten carbide can be attached to a strip of nickel 10 (Fig. 3); or to a coated strip including nickel 13 (Fig. 4); or for a mechanical mixture or conglomerate of nickel 14 and tungsten carbide 11 (Figs. 3 and 4) to be attached to any strip of material capable of supporting them; or held together in rod form by a suitable binder, such as sodium silicate 15 (Fig. 5). If deemed expedient, the strips can be curved into a tray shape (Fig. 6) for greater securing capacity of the carbides; or the carrier can consist of a screen.

The welding rod can also be composed of any of the tube, strip, or binder forms enumerated containing or supporting tungsten carbide which has been previously coated with nickel or its equivalent. A rod of this type will protect to an additional extent the tungsten carbide and will also provide additional metal alloyable with the body of the tool.

Although my invention has been described in connection with tungsten carbide, it is to be understood that equivalent carbides can be used, such as tantalum, titanium, chromium, columbium, molybdenum, etc. It is to be understood further that many substitutes for nickel, such as cobalt and copper, are applicable to protect the carbide and impart desirable properties to the body by alloying therewith.

Since changes can be made to the welding rods and materials used without departing from my invention, it is to be understood that the preceding description is illustrative of rather than restrictive upon the scope of the following claims.

I claim:

1. A welding rod containing individual hard metallic carbide pieces adapted to be welded to an iron body, each piece being in a substantially pure state, said rod including a substantially pure non-carbon absorbing metal from the iron group free from normal adherence to the carbide pieces and in close proximity thereto to protect the carbide pieces during the welding operation against chemical decomposition or alloying with the iron body by flowing of the non-carbon absorbing metal around the individual carbide pieces.

2. A welding rod containing individual hard metallic carbide pieces adapted to be welded to an iron body, each piece being in substantially pure state, said rod including substantially pure nickel free from normal adherence to the carbide pieces in close proximity thereto to protect the carbide pieces during the welding operation against chemical decomposition or alloying with the iron body by flowing of the substantially pure nickel around the individual carbide pieces.

3. A welding rod containing individual tungsten carbide pieces, adapted to be welded to an iron body, each piece being in a substantially pure state, said rod including substantially pure nickel free from normal adherence to the tungsten carbide pieces in close proximity thereto to protect the carbide pieces during the welding operation against chemical decomposition or alloying with the iron body by flowing of the substantially pure nickel around the individual carbide pieces.

4. A welding rod comprising a substantially pure nickel tube and a loose mass of individual pieces of tungsten carbide within the tube, said nickel being adapted to protect the carbide against chemical decomposition during the welding operation by flowing around the individual carbide pieces.

5. A welding rod comprising a tube of a substantially pure non-carbon absorbing metal from the iron group, and a loose mass of individual pieces of a hard metallic carbide within the tube, said non-carbon absorbing metal being adapted to protect the carbide against chemical decomposition during the welding operation by flowing around the individual carbide pieces.

6. A welding rod comprising an envelope of substantially pure nickel containing only individual pieces of tungsten carbide.

7. A welding rod comprising an envelope of a substantially pure non-carbon absorbing metal from the iron group containing only individual pieces of a hard metallic carbide.

8. A welding rod comprising a tubular member, a loose mass of individual pieces of a hard metallic carbide within the tube, and a substantially pure non-carbon absorbing metal from the iron group within the tubular member and free from normal attachment to the carbide, said non-carbon absorbing metal being adapted to protect the carbide against chemical decomposition during the welding operation by flowing around the individual carbide pieces.

JOHN A. ZUBLIN.